(12) United States Patent
Böhnke

(10) Patent No.: US 9,649,580 B2
(45) Date of Patent: May 16, 2017

(54) FILTER DEVICE AND METHOD FOR OPERATING A FILTER DEVICE

(71) Applicant: Outotec (Finland) Oy, Espoo (FI)

(72) Inventor: Bernd Böhnke, Eschweiler (DE)

(73) Assignee: Outotec (Finland) Oy, Espoo (FI)

( * ) Notice: Subject to any disclaimer, the term of this patent is extended or adjusted under 35 U.S.C. 154(b) by 87 days.

(21) Appl. No.: 14/433,748

(22) PCT Filed: Oct. 12, 2012

(86) PCT No.: PCT/EP2012/070243
§ 371 (c)(1),
(2) Date: Apr. 6, 2015

(87) PCT Pub. No.: WO2014/056542
PCT Pub. Date: Apr. 17, 2014

(65) Prior Publication Data
US 2015/0265947 A1    Sep. 24, 2015

(51) Int. Cl.
*B01D 25/30*    (2006.01)
*B01D 29/56*    (2006.01)
(Continued)

(52) U.S. Cl.
CPC .......... *B01D 25/302* (2013.01); *B01D 25/12* (2013.01); *B01D 25/215* (2013.01); *B01D 29/56* (2013.01)

(58) Field of Classification Search
CPC .. B01D 25/215; B01D 2201/34; B01D 29/56; B01D 25/12; B01D 25/30–25/302
See application file for complete search history.

(56) References Cited

U.S. PATENT DOCUMENTS 1,693,717 A * 12/1928 Lienesch ................ B01D 27/06
                                                    210/167.02
2,883,058 A *  4/1959 Jaume ..................... B01D 25/24
                                                    210/483
(Continued)

FOREIGN PATENT DOCUMENTS

WO    2004/067142 A1    8/2004

OTHER PUBLICATIONS

International Preliminary Report on Patentability from corresponding PCT Application No. PCT/EP2012/070243, mailed Dec. 22, 2014, with Amendments under Article 34 Amendments, 22 pgs.
(Continued)

*Primary Examiner* — David C Mellon
*Assistant Examiner* — Liam Royce
(74) *Attorney, Agent, or Firm* — Chernoff, Vilhauer, McClung & Stenzel, LLP

(57) ABSTRACT

The invention suggests a filter device having a stationary head piece and a movable end piece, a pack of at least a recess plate and an adjacent recess plate between the head piece and the end piece, the recess plate and/or the adjacent recess plate having a recess, that forms a filter chamber between the recess plate and the adjacent recess plate, a first filter cloth and a second filter cloth between the recess plate and the adjacent recess plate for retaining as a filter cake a solid content of a suspension, and allowing a remaining liquid fraction of the suspension to pass as a filtrate, and a suspension pipe running through the pack between the head piece and the end piece for charging the suspension through the filling shoe between the first filter cloth and the second filter cloth into the filter chamber, and a filling shoe comprising an outlet section for the suspension, clamping the first filter cloth to the recess plate during filtering operation of the filter device, an anchoring section for anchoring the
(Continued)

filling shoe in an anchoring position to the recess plate, and a pivot section between the outlet section and the anchoring section, that tiltably connects the outlet section to the anchoring section. The invention further suggests a method for operating such filter device.

5 Claims, 2 Drawing Sheets

(51) Int. Cl.
*B01D 25/12* (2006.01)
*B01D 25/21* (2006.01)

(56) References Cited

U.S. PATENT DOCUMENTS

| | | | | |
|---|---|---|---|---|
| 3,637,082 A | * | 1/1972 | Bentzien | B01D 25/164 |
| | | | | 210/225 |
| 3,979,298 A | * | 9/1976 | Breysse | B01D 25/176 |
| | | | | 210/232 |
| 4,740,413 A | * | 4/1988 | Wildner | B01D 25/001 |
| | | | | 156/290 |
| 6,852,220 B1 | | 2/2005 | Grafen et al. | |
| 2010/0155344 A1 | | 6/2010 | Bonn | |

OTHER PUBLICATIONS

International Search Report from corresponding PCT Application No. PCT/EP2012/070243, mailed Jul. 2, 2013, 3 pgs.

* cited by examiner

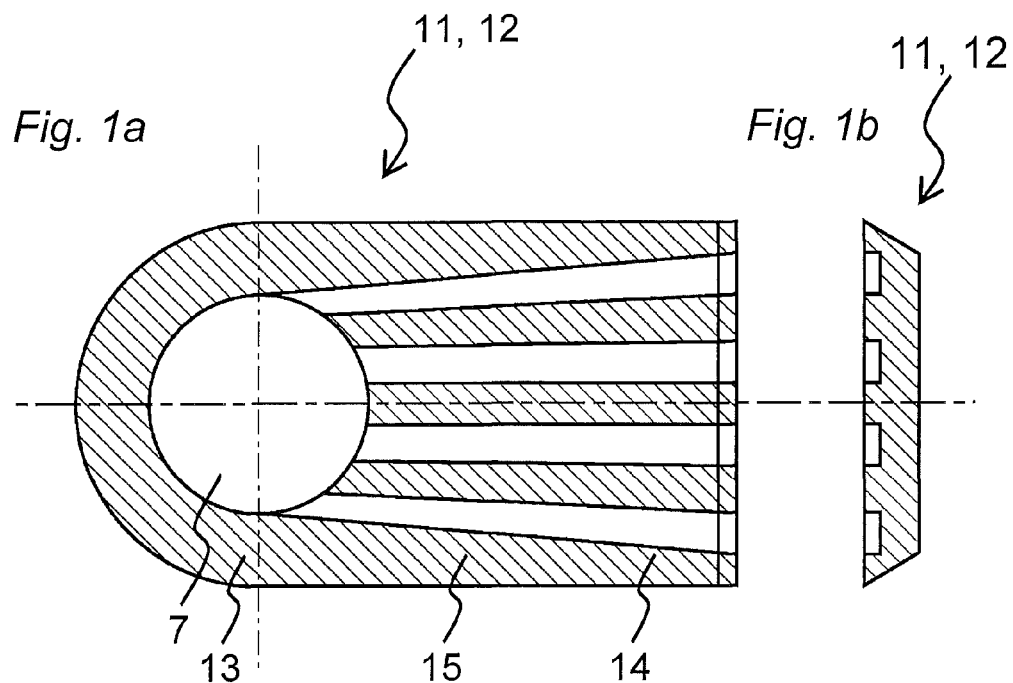
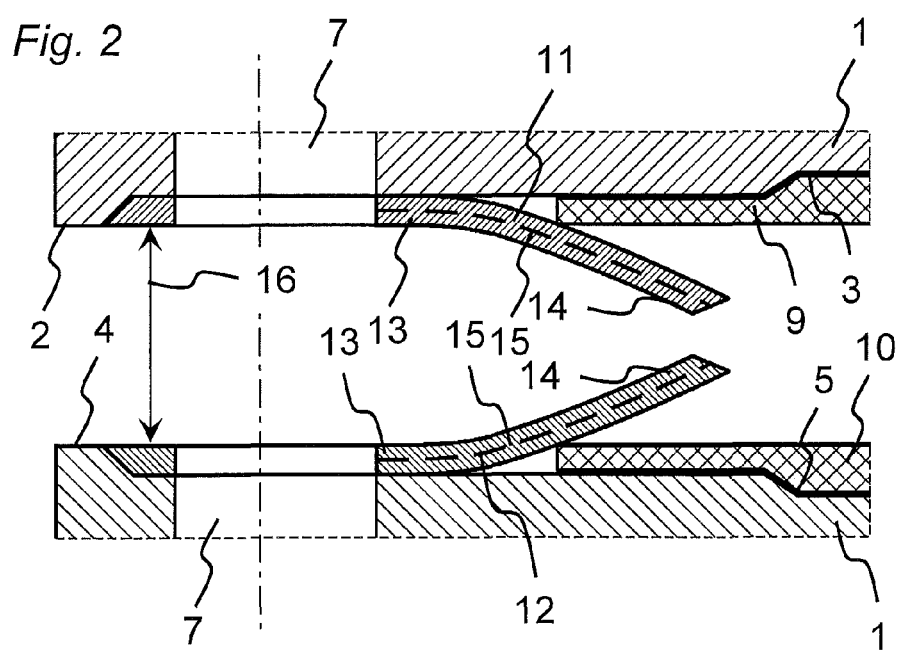

FILTER DEVICE AND METHOD FOR OPERATING A FILTER DEVICE

CROSS-REFERENCE TO RELATED APPLICATIONS

This is a national stage application filed under 35 USC 371 based on International Application No. PCT/EP2012/070243 filed Oct. 12, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The invention relates in general to filtering and in particular to a method for operating a filter device and to a filter device.

In press filter devices, a filter chamber is formed between at least two adjacent recess plates by the recess of at least one of the recess plates. For filtering, i.e. retaining a solid content of a suspension as a filter cake and allowing a remaining liquid fraction of the suspension to pass as a filtrate, the suspension is charged from a suspension pipe through a filling shoe between two filter cloths inside the filter chamber. After filtering operation of the filter device a clearance between the adjacent recess plates is established by displacing at least one of the adjacent recess plates, for discharging the filter cake and further cleaning or even replacing the filter cloths, if required.

The filling shoe is between the two filter cloths and, in filtering operation, clamps the filter cloths to the respective filter plates in order to avoid the suspension to leak from the filter chamber. However, this clamping must be released in opening the filter device after filtering operation at least in order to allow the filter cloths to be replaced. Two solutions were suggested for allowing the filter shoe clamping the filter cloths to be released in opening the filter device:

It was suggested to attach the filling shoe to one of the filter cloth. However, due to wear and deformation of both the recess plate and the filter cloth, the shoe being attached to the filter cloth is increasingly difficult to position exactly into its cavity before closing the filter device for the following filtering operation.

It was further suggested to mount the filling shoe outside the cloth area to the recess plate by a mechanism, for example kind of a hinge, or even outside the plate area, e.g. to a plate hanger assembly.

Misalignment of the filling shoe, i.e. horizontally and/or vertically wrong positioning as well as distortion causes leakage of the filter device, increasing forces and following damages to cloth, membrane, filling shoe and recess plate. Leakage between the filling shoe and its respective cavity further causes accumulation of the solid content of the suspension behind the filter cloth as well as blocking of pipe areas, and uneven distribution of drying gas and washing liquids.

Furthermore, in open position of the filter device, the filling shoes in the state of the art allow the suspension and its solid content, or even fragments of the filter cake to drain into the contact area between the filling shoe and the recess plate, in particular near the suspension pipe, causing mechanical as well as sealing problems in filtering operation.

PROBLEM TO BE SOLVED

It is an object of the invention to avoid the drawbacks of the state of the art.

BRIEF SUMMARY OF THE INVENTION

The invention suggests a filter device having a stationary head piece and a movable end piece, a pack of at least a recess plate and an adjacent recess plate between the head piece and the end piece, the recess plate and/or the adjacent recess plate having a recess, that forms a filter chamber between the recess plate and the adjacent recess plate, a first filter cloth and a second filter cloth between the recess plate and the adjacent recess plate for retaining as a filter cake a solid content of a suspension, and allowing a remaining liquid fraction of the suspension to pass as a filtrate, and a suspension pipe running through the pack between the head piece and the end piece for charging the suspension through the filling shoe between the first filter cloth and the second filter cloth into the filter chamber, and a filling shoe comprising an outlet section for the suspension, clamping the first filter cloth to the recess plate during:filtering operation of the filter device, an anchoring section for anchoring the filling shoe in an anchoring position to the recess plate, and a pivot section between the outlet section and the anchoring section, that tiltably connects the outlet section to the anchoring section.

Permanently anchoring the filling shoe to the recess plate, and in particular to the suspension pipe, and only moving the outlet section that in filtering operation clamps the filter cloth effectively avoids any contamination of the contact area as well as the related effects of such contamination known from the state of the art. The anchoring section may e.g. provide a socket for clamping into the suspension pipe, or support for screws, or even an area prepared for glueing the filling shoe to the recess plate around the suspension pipe.

Preferably, in a filter device according to the invention, the pivot section is elastic. Elasticity means the property of the pivot section autonomously regaining a relaxed shape after removal of external forces that previously imposed another shape. In particular, such filling shoe may be forced between the recess plate and the adjacent recess plate for filtering operation, including clamping the filter cloth, and autonomously regain a shape that releases the filter cloth, when opening the filter device.

Alternatively, the pivot section may provide only a loose connection of the outlet section to the anchoring section, thus in open position of the filter device allowing for the underlying filter cloth to lift the outlet section. Further alternatively, the pivot section may be connected to an external lifting element between the recess plate and the filling shoe that forces the outlet section to tilt away from the filter cloth. Even further alternatively, the elastic as well as the loosely connecting pivot sections may be combined with an external lifting element.

Further preferred, in such filter device having an elastic pivot section, the pivot section has a spring element. Including the spring element into the filling shoe avoids pollution of the spring element during operation, and provides for regularly replacing the spring element together with the filling shoe as a wear part Even further preferred, in such filter device having a spring element, the spring element is made of fiber reinforced plastic. Young's modulus and resistance to bending of fiber reinforced plastic can easily be accustomed to the respective need. The plastic may be reinforced by glass fiber, or by carbon fiber, or by ceramic or even metal fiber. Alternatively, the spring element may be a wire spring, or a combination of several wire springs, or even a pneumatic spring.

Preferably, in such filter device having an elastic pivot section, a profile of the pivot section is straight during filtering operation of the filter device and curved in a relaxed state. Such filling shoe requires only a reduced opening diameter of the clearance between the recess plates, in open position of the filter device.

In an advantageous embodiment of the invention, the filling shoe is made of an elastomer. Making the entire filling shoe, i.e. not only the pivot section, but also the output section and even the anchoring section of a single elastomer material, remarkable reduces production efforts and thus costs for the filling shoe.

Preferably, such filling shoe entirely made of an elastomer has a stabilizing element, that decreases elasticity of at least the outlet section. The outlet section may require stabilization to avoid it to freely dangle from the pivot section, and in particular to bend back to the filter cloth. Such stabilizing element may e.g. be either an external rail or an internal bolt, made of steel, or of plastic, in particular polyethylene or polypropylene.

The invention further suggests a method for operating a filter device having a stationary head piece and a movable end piece, a pack of at least a recess plate and an adjacent recess plate between the head piece and the end piece, the recess plate and/or the adjacent recess plate having a recess, that forms a filter chamber between the recess plate and the adjacent recess plate, a first filter cloth and a second filter cloth between the recess plate and the adjacent recess plate, a suspension pipe running through the pack between the head piece and the end piece, and a filling shoe that is connected to the suspension pipe and has an outlet section between the first filter cloth and the second filter cloth, the method comprising the steps of charging the suspension through the suspension pipe into the filling shoe and through the outlet section between the first filter cloth and the second filter cloth into the filter chamber, the first filter cloth and the second filter cloth retaining as a filter cake a solid content of a suspension, and allowing a remaining liquid fraction of the suspension to pass as a filtrate, wherein the outlet section clamps the first filter cloth to the recess plate, and after filtering operation establishing a clearance between the recess plate and the adjacent recess plate by displacing at least the recess plate or the adjacent recess plate, wherein an anchoring section of the filling shoe remains anchored to the recess plate and the outlet section automatically tilts away from the recess plate at a pivot section between the outlet section and the anchoring section, that tiltably connects the outlet section to the anchoring section, thus releasing the first filter cloth. The method according to the invention is executed making use of the above innovative filling shoe and features the same advantages.

Preferably, in a method according to the invention, during filtering operation, the filling shoe is forced to be straight and, when the outlet section tilts away from the first filter cloth, relaxes to be curved. Such method is executed making use of the above innovative filling shoe having an elastic pivot section and features the same advantages.

Further preferred, in a method according to the invention, a lifting element between the recess plate and the filling shoe forces the outlet section to tilt away from the first filter cloth. The external lifting element may in particular be a spring or an electromagnetic or fluid drive operated by pressurizing fluids, i.e. air, oil or other gas or liquid. The external lifting element allows for controlled lifting the outlet section from, and controlled restoring to the filter cloth.

In an advantageous embodiment of a method according to the invention, the filter device has a second filling shoe that is connected to the suspension pipe and has a second outlet section between the first filter cloth and the second filter cloth, wherein at least one outlet duct from the suspension pipe to the filter chamber is formed between the filling shoe and the second filling shoe, and wherein after filtering operation a second anchoring section of the second filling shoe remains anchored to the adjacent recess plate and the second outlet section automatically tilts away from the adjacent recess plate, thus releasing the second filter cloth. The outlet duct(s) may preferably be built by combining the two opposing filter shoes, wherein each filter shoe has no closed profile pipes but open grooves that are only covered by the opposing filter shoe. Such filter shoes provide for easy cleaning the outlet ducts in open position of the filter device.

BRIEF DESCRIPTION OF THE SEVERAL VIEWS OF THE DRAWINGS

The filling shoe according to the invention and the associated method are subsequently described in more detail with reference to preferred embodiments illustrated in the drawing figures.

FIG. 1a/b shows a filling shoe of the filter device,

FIG. 2 shows a cross-section detail of a filter device in open position,

DETAILED DESCRIPTION OF THE INVENTION

Figure 3:
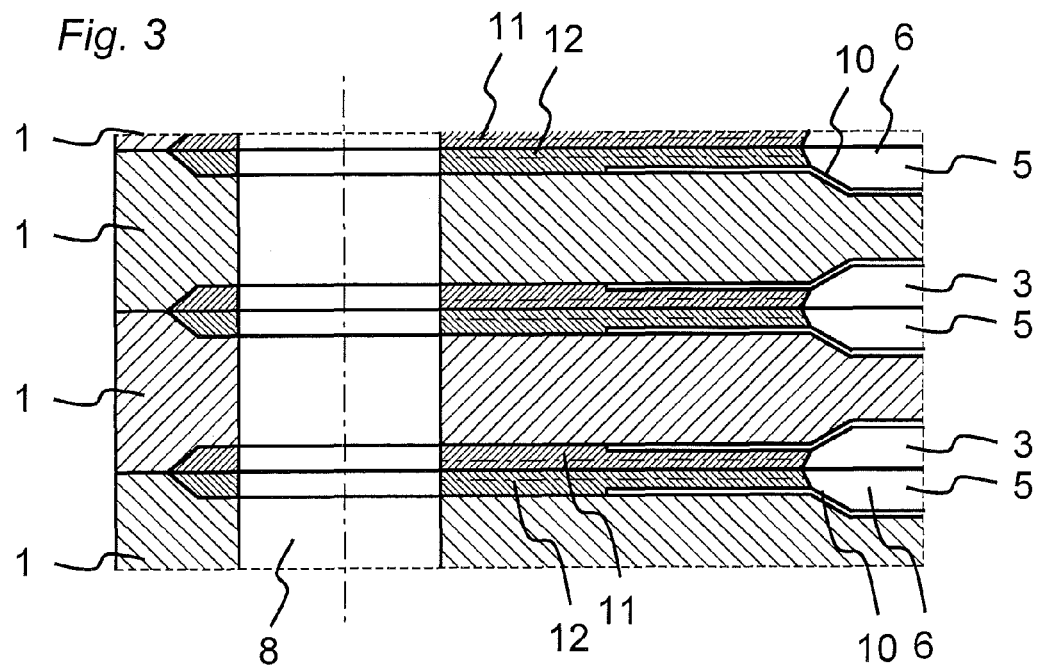
FIG. 3 shows the cross-section detail of the filter device in filtering operation.

A filter device has between a stationary head piece and a movable end piece a pack of 70 identical recess plates 1, made of PP and measuring 3500×3500×100 mm width× height×thickness. On a first face 2, the recess plate 1 has a first recess 3, and on a second face 4 opposite to the first face 2 the recess plate 1 has a second recess 5. In the pack, between two adjacent recess plates 1, the first recess 3 of a recess plate 1 and the second recess 5 of an adjacent recess plate 1 form a filter chamber 6. The recess plates 1 of the pack and the end piece are guided at check rails.

The recess plates 1 are split into main part and attachment parts at two sides in order to overcome a restriction in size defined by common moulding presses used for manufacturing recess plates 1. However, the invention is not restricted to recess plates 1 assembled from main parts and attachment parts, but may also be applied with recess plates 1 moulded in one. The recess plates 1 have suspension channels 7, forming a suspension pipe 8, and filtrate channels, forming filtrate pipes running through the pack and through the attachment parts of the recess plates 1 between the head piece and the end piece.

The filter device has a first filter cloth 9 and a second filter cloth 10 between each recess plate 1 and adjacent recess plate 1, and first filling shoes 11 and second filling shoes 12 connected to the suspension pipe 8, between each first filter cloth 9 and second filter cloth 10. A filling shoe 11, 12 is in detail shown in FIGS. 1a and 1b. An anchoring section 13 of the first filling shoe 11 is anchored to the recess plate 1 and an anchoring section 13 of the second filling shoe 12 is anchored to the second recess plate 1 each by a ring of screws around the suspension pipe 8.

The filling shoes 11, 12 each have an outlet section 14 for guiding the suspension between the first filter cloths 9 and second filter cloths 10. Between anchoring section 13 and outlet section 14 each filling shoe 11, 12 has an elastic pivot section 15 that tiltably connects the outlet section 14 to the anchoring section 13. The filling shoes 11, 12 are entirely made from rubber, with a glasfiber reinforced plastic element vulcanized therein. In the pivot section 15, the plastic element has spring characteristics, and stabilizes both the anchoring section 13 and the outlet section 14 by decreasing their respective elasticity. The filling shoes 11, 12 have grooves that are only covered by the corresponding filling shoe 11, 12 in filtering position, and open for easy cleaning in open position of the filter device In open position of the filter device, adjacent recess plates 1 are open to a distance 16 of 100 mm. The pivot sections 15 of the filling shoes 11, 12 are relaxed to a curved form and the filter cloths 9, 10 are free to move, as shown in FIG. 2. For starting a filtration cycle, the end piece is moved towards the head piece by hydraulic rams, until all recess plates 1 are loosely in contact. In this position, the end piece is pressed to the pack.

With the filter device being in filtering position, as shown in FIG. 3, a suspension is charged through the suspension pipe 8 into the filling shoes 11, 12 and through the outlet sections 14 between the first filter cloth 9 and the second filter cloth 10. While the filter chambers 6 are filled with the suspension, and the suspension pressed through the filter cloths 9, 10, the solid content of the suspension settles at the filter cloths 9, 10, and the liquid fraction of the suspension permeates the same and discharges from the filter chambers 6. During filtering operation, the filling shoes 11, 12 are forced to be straight. The outlet section 14 of the first filling shoe 11 clamps the first filter cloth 9 to the recess plate 1, and the outlet section 14 of the second filling shoe 12 clamps the second filter cloth 10 to the adjacent recess plate 1.

After filtering, the filter device is disconnected from the suspension supply and membranes are charged with water, at a squeezing pressure, forcing the membranes into the filter chambers 6, and squeezing the remaining suspension out of the filter cake. Then, the filter chamber 6 is supplied with drying air from the recess plate 1, that streams through the filter cloths 9, 10 and the filter cake in between, and discharges through the adjacent recess plate 1.

After drying the filter cake, the end plate is released and the filter device and the pack of recess plates 1 opened again for unloading the filter cake, for cleaning and revising the filter cloths 9, 10, the membranes and the recess plates 1, in particular the filter chambers 6, for another filtration cycle. By opening the pack, the pivot section 15 of the filling shoes 11, 12 are relaxed to a curved form and the outlet sections 14 automatically tilt away from the respective recess plates 1, thus releasing the respective filter cloths 9, 10.

Figure 4:
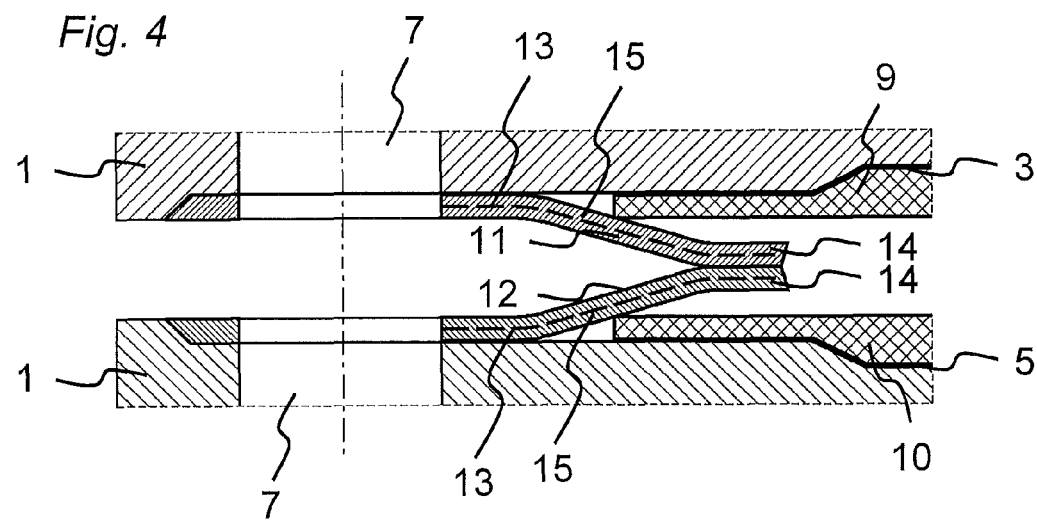
FIG. 4 shows the cross-section detail of the filter device in partly-open position.

FIG. 4 shows a partly-open position of the pack, wherein the first and second filter shoes are still in contact. The spring stiffness of the plastic element, and thus of the pivot section 15 is lower near the outlet section 14. The pivot sections 15 of the filling shoes 11, 12 are s-shaped in this state, thus enabling the outlet section 14 to release the respective filter cloth 9, 10 without entirely opening the pack for quick discharge of the filter cake, and leaving the need for fully opening the pack for further maintenance of the filling shoes 11, 12.

IN THE FIGURES 1 recess plate
2 first face
3 first recess
4 second face
5 second recess
6 filter chamber
7 suspension channel
8 suspension pipe
9 first filter cloth
10 second filter cloth
11 first filling shoe
12 second filling shoe
13 anchoring section
14 outlet section
15 pivot section
16 distance

The invention claimed is:

1. A filter device having a stationary head piece and a movable end piece, a pack of at least a recess plate and an adjacent recess plate between the head piece and the end piece, the recess plate and/or the adjacent recess plate having a recess, that forms a filter chamber between the recess plate and the adjacent recess plate, a first filter cloth and a second filter cloth between the recess plate and the adjacent recess plate for retaining as a filter cake a solid content of a suspension, and allowing a remaining liquid fraction of the suspension to pass as a filtrate, and a suspension pipe running through the pack between the head piece and the end piece for charging the suspension through a filling shoe between the first filter cloth and the second filter cloth into the filter chamber, and the filling shoe comprising
   a. an outlet section for the suspension, clamping the first filter cloth to the recess plate during filtering operation of the filter device,
   b. an anchoring section for anchoring the filling shoe in an anchoring position to the recess plate, and
   c. a pivot section between the outlet section and the anchoring section, that tiltably connects the outlet section to the anchoring section;
wherein the pivot section is elastic and wherein the pivot section has a spring element.

2. A filter device according to claim 1, wherein the spring element is made of fiber reinforced plastic.

3. A filter device according to claim 1 wherein a profile of the pivot section is straight during filtering operation of the filter device and curved in a relaxed state.

4. A filter device according to claim 1, wherein the filling shoe is made of an elastomer.

5. A filter device according to claim 4, having a stabilizing element, that decreases elasticity of at least the outlet section.

* * * * *